Figure 1:
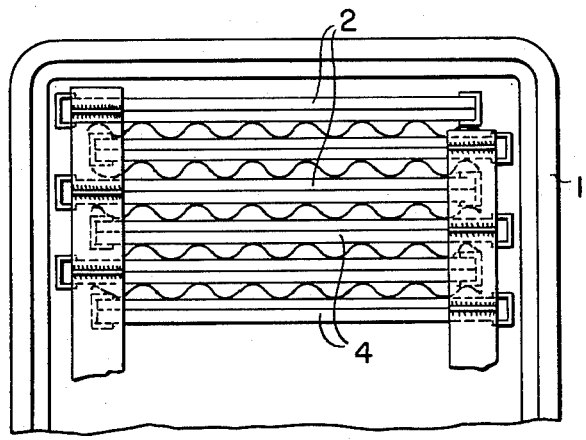

Nov. 27, 1962 H. H. WINKLER 3,066,178
ALKALINE STORAGE BATTERY HAVING SUPERACTIVATED
ELECTRODES AND METHOD OF SUPERACTIVATING THE
ELECTRODE MATERIALS
Filed Feb. 2, 1954

United States Patent Office 3,066,178
Patented Nov. 27, 1962

3,066,178
ALKALINE STORAGE BATTERY HAVING SUPER-ACTIVATED ELECTRODES AND METHOD OF SUPERACTIVATING THE ELECTRODE MATERIALS
Hans H. Winkler, Zwickau, Saxony, Germany, assignor to VEB Grubenlampenwerke, Zwickau, Saxony, Germany, a German corporation
Filed Feb. 2, 1954, Ser. No. 407,628
32 Claims. (Cl. 136—24)

My invention relates to storage batteries of the alkaline type known chiefly through the work of Edison, Jungner, Poerscke and Achenbach. The positive electrode of such storage batteries consists of electrochemically active nickel hydroxide to which, for better conductivity, nickel or graphite flake is added. The negative electrode comprises, as electrochemically active material, either iron powder or pulverulent cadmium. To prevent sintering of the cadmium powder, additions are made of iron oxide, iron powder, copper powder and the like. The active electrode materials are ordinarily deposited within plate-shaped containers made from perforated iron or nickel sheets, or are trowelled into such containers or into the interstices of sintered frame or grid structures.

The invention further relates to a process of activating the principal materials of the positive and negative electrodes of alkaline storage batteries and has for its objects to greatly increase the efficiency and quality of such storage batteries, to reduce the sensitivity of the batteries to external influences, and to simplify the handling and care of such batteries.

To achieve these objects and in accordance with a feature of my invention, the electrodes of alkaline storage batteries are superactivated by the addition of a metal compound to the active electrode material. More specifically, this method and means of superactivation is applied chiefly to three kinds of electrode masses to convert them into a novel type of electrode. The three kinds of masses are: electrochemically positive nickel hydroxide, electrochemically negative iron, and electrochemically negative cadmium. Accordingly, a storage battery made according to the invention and considerably more efficient than prior batteries of this type may have a positive electrode whose active mass consists of nickel hydroxide superactivated by cobalt compound while the negative electrode either consists of iron or cadmium also superactivated by metal compound, or of a conventional iron or cadmium electrode or of any other optional negative electrode. Likewise, a greatly improved storage battery is obtained if the electrochemically negative mass of the iron or cadmium electrode is superactivated in the herein-disclosed manner and is used in conjunction with a standard positive electrode from nickel hydroxide or any other conventional material. However, best results are achieved if not only the positive electrode comprises material superactivated according to the present invention, but the negative electrode as well.

For purposes of this invention, the respective principal electrode materials may be used in the pure state or may contain certain additions, for example nickel flock may be added to the nickel hydroxide, mercury or sulphur to the iron, or iron powder to the cadmium.

Figure 2:
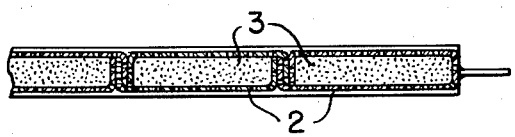

Before describing the invention more in detail, it may be mentioned that as regards structural design and external appearance, batteries made according to the invention may be similar to the known alkaline-type storage batteries. That is, the active electrode materials may be contained in pockets or interstices of frame or grid-shaped electrode plates or of plates having any other shape or construction, an embodiment of a battery according to the invention being schematically illustrated on the accompanying drawing by a top view (FIG. 1) and a cross section through one of the negative electrode plates (FIG. 2).

The illustrated battery has a container 1 of nickel-plated steel filled with alkaline electrolyte, for instance, an aqueous solution of potassium hydroxide, in which the active electrode materials are not soluble. The negative electrodes 2 consist of plates, for instance of steel, and contain the superactivated electrochemically negative material (iron or cadmium) in the pockets at 3. The positive electrode 4 may be similar in material and design to the negative electrodes, except that the pockets contain the electro-positive nickel hydroxide superactivated by cobalt compound.

The process of superactivating the positive electrode mass made from nickel hydroxide consists, essentially, in adding a cobalt compound to the electrochemically positive mass either during or after the preparation of that mass, or in adding the compound to the finished plate. Most suitable for the addition is cobalt hydroxide or a cobalt salt, particularly cobalt sulphate, cobalt chloride, or an organic cobalt salt. The addition of the cobalt compound can take place immediately after precipitation or drying of the nickel hydroxide or after remoistening the nickel hydroxide. However, the finished electrode may also be submerged in a cobalt solution or suspension or may be sprayed therewith. In each case, the amount of cobalt added should not exceed 2% of the entire mass.

The process of superactivating the negative electrode made of an iron mass consists in adding to the iron mass the salt of a metal more precious than iron, such as a copper salt, preferably copper sulphate. In this instance, the metal salt is added to the previously prepared active mass, which may be either pure or may contain an addition of sulphur, selenium, tellurium or a compound thereof. The addition can be also made to the finished electrode by submerging it, prior to induction, into a solution of the particular metal salt, or by spraying it with the metal salt solution or moistening it therewith. The amount of metal salt added should not exceed 2% of the entire mass.

The process of superactivating a negative electrode made from cadmium consists in adding to the electrochemically negative cadmium mass a metal salt, particularly nickel sulphate, either during or after the preparation of the electrode material, or in adding the metal salt to the finished electrode frame. In the last-mentioned case, the finished electrode is submerged, prior to the formation treatment, in a solution of the metal salt or is sprayed or moistened with it. The amount of metal salt added in this manner is limited to a maximum of 2% of the entire mass.

Wherever in the foregoing reference is made to a maximum of 2%, it should be understood that when impregnating the electrode mass with superactivating metal compound, there occurs a saturation of the mass beyond which no further activating effect is obtained. The saturation point is different with different kinds of electrode masses and in most cases, is not more than 2% of added compound. Generally, a further addition is not detrimental but, for lack of further improvement, is not economical.

Without detriment to the desired effect, the described processes according to the invention can be applied to electrode materials comprising the various above-mentioned additional substances. The superactivation resulting from the method according to the invention does not obviate the effects of the known additive substances but rather enhances such effects.

In the case of nickel hydroxide, the activating effect of the addition of a cobalt compound seems to consist in a retention of the primary structure. The individual particles of the mass are prevented from growing coarse or bigger such as particles following Ostwald's Rule of ripening, and the large electrochemically active surface is thus retained.

One explanation of the effect of the addition of metal compounds to the electrochemically active negative masses is that an ion exchange takes place between the principal material and the added metal compound, and that the individual particles of the mass obtain a fine coating of the added metal. The superactivating effect of the added metal upon the negative iron mass may be explained, for example, as being due to the formation of a thin metal film covering the individual particles of the principal mass which forms a sulphide with the sulphur set free by the iron during the discharge cycle. The increased electrochemical activity of an iron mass activated in the herein-described manner may be caused by a migration of the sulphur back to the iron mass to form sulphides therewith during the charging cycle.

The methods used for superactivating the particular electrode masses are closely related to each other, since in each case there is added to the electrochemically active mass a metal compound adapted to the principal material of the mass. The best results are obtained if cobalt sulphate is added to the nickel hydroxide mass, copper sulphate to the ferrous mass, and nickel sulphate to the cadmium mass. Therefore, the invention can be defined as a process for superactivating the electrodes of alkaline storage batteries that consists in giving the electrochemically active electrode masses an addition of different metal salts, primarily metal sulphates, as suited for the particular mass.

The aforementioned processes relating particularly to the activation of finished plates that already contain the electrochemically active mass can also be used for the regeneration of old, exhausted plates to bring such plates back to their nominal capacity.

Various methods have been suggested, particularly in the early stages of the development of alkaline-type storage batteries, to increase the efficiency of the electrochemically active electrodes by the addition of various materials. Some increase in efficiency has been obtained in some cases. However, these prior suggestions include either the use of different materials at a different point of the procedure or in different amounts, so that the results are dissimilar from the results of the herein-claimed processes. Neither of these prior methods has been able to bring about such an intrinsic change in the efficiency and the qualitative properties of alkaline storage batteries as the means and the methods of the present invention.

The only purpose of the previously known addition of graphite-, nickel- or cobalt-flock to the active mass of nickel hydroxide is to increase the conductivity of the nickel hydroxide mass which is a relatively bad conductor.

According to another known method, the conductivity of the nickel hydroxide mass is increased by mixing it with the dispersion or solution of a good conductor, such as graphite, nickel or cobalt, and producing a colloidal precipitate of the mixture in order to reduce the internal resistance of the nickel hydroxide.

In some other cases, cobalt has been mentioned as active anode material in lieu of nickel hydroxide rather than as an addition thereto. Indeed, cobalt is a companion element of nickel and traces of cobalt are always found as impurities in nickel, which explains the possibility of using these metals interchangeably. In contrast thereto, it is essential to my invention that a cobalt compound rather than the metal as such is added, not at the start but at a certain stage of the process of preparing the electrochemically active mass, for example immediately after precipitation or after drying or remoistening the mass, or that the cobalt compound is added to the finished plate.

In the case of an electrochemically active iron mass, relatively large amounts of mercury alone or mercury in conjunction with copper have been added by Edison who claimed to thereby facilitate the reduction of the active material during the charging cycle. The addition of mercury was the important factor presumably because mercury would bind any traces of sulphur occurring in the iron as impurity, by forming mercury sulphide. The activating effect of sulphur probably in form of sulphides in the iron mass was not recognized and these methods did not result in the degree of activation attained by means of the present invention.

Various so-called spreading means have been added in the past to cadmium electrodes to prevent sintering of the electrode mass and the resulting decrease in the capacity of the storage battery. Until now, the principal addition materials have been iron powder, iron oxide, graphite, etc. None of these addition materials has been fully satisfactory, because they are all of relatively large particle size in comparison with the individual particles of activated cadmimum. Therefore, these materials are incapable of coating the individual cadmium particles in the desired manner. This, however, is necessary for highest effectiveness of the active mass and has been singularly achieved by the present invention.

It has also been suggested to add iron, nickel, copper or mercury in form of insoluble or difficulty soluble salts to an active electrode mass consisting of a difficulty soluble cadmium salt that is obtained from a complex cadmium-ammonia solution and changes into the spongy cadmium mass only during the subsequent formation treatment. In this process, the addition compounds are precipitated jointly with the difficulty soluble cadmium salts, and the purpose of the addition is to prevent sintering of the cadmium carbonate which serves as the starting material in this process and has a pronounced tendency to sinter. Consequently, the effect of the prior method is basically dissimilar from that of the present invention, which is to prevent a sintering of the electrochemically active mass during subsequent use and after many charging and discharging cycles.

The effect of the herein-disclosed process upon the electrodes of alkaline storage batteries treated or prepared in accordance with this invention is amazing, particularly in the case of nickel-iron or nickel-cadmium systems. Storage batteries with electrodes prepared or treated according to the invention show an increase in capacity up to 30% and have the further advantage that they retain the initial capacity even during discharges at high current intensity, and they are practically insensitive to reversed charging and excessive discharges. Moreover, the performance of the storage battery remains unimpaired by any carbonization of the potassium hydroxide solution which occurs very rapidly through absorption of carbon dioxide from the air. This greatly simplifies the care of such batteries. In addition, the sensitivity of the battery at very high and very low temperatures is greatly reduced.

The preparation and superactivation of the electrode masses according to the present invention is illustrated in the following examples:

*Example 1*

Nickel hydroxide which has been precipitated from a nickel sulphate solution by means of adding sodium hydroxide is filtered off and dried. After mixing graphite or another suitable conductor with the nickel hydroxide, the mixture is soaked with the solution of a cobalt salt, again dried or again treated with an alkali. Soluble reaction products contained in the nickel hydroxide can be removed by washing immediately thereafter. The cobalt uptake by means of this treatment should be no more than 2% of the entire mass.

*Example 2*

Electrochemically active iron powder containing sulphur in form of sulphides is soaked with a copper sulphate solution. The reaction taking place between copper sulphate and metallic iron results in a highly active electrode mass. The copper content of the mass should not exceed 2%. After the treatment, the material can be washed to remove other reaction products, or it can be dried in any customary manner prior to washing.

*Example 3*

Finely divided cadmium powder, obtained by chemical precipitation, which is absolutely pure or which may contain additions of iron powder, iron oxide, copper powder or the like, is filled into the pockets of the electrode plates. The finished plates are dipped into a solution of nickel sulphate. Thereafter the plates are subjected to the customary formation treatment.

It will be obvious to those skilled in the art, upon a study of this disclosure, that the invention is applicable with numerous and diversified designs and variations of alkaline-type storage batteries and hence may be given embodiments other than those specifically described, without departing from the essence of my invention and within the scope of the claims annexed hereto.

I claim:

1. The method of treating the positive electrode of an alkaline storage battery having as the electrochemically active mass a nickel hydroxide intermingled with a finely divided conductor, which comprises the steps of soaking said mass with the solution of a cobalt compound, drying and removing soluble reaction compounds by washing, the battery being a nickel-cadmium battery.

2. The method defined in claim 1 in which the soaked mass is treated with an alkaline solution prior to washing.

3. The method of treating the negative electrode of an alkaline nickel-iron storage battery comprising as the electrochemically active mass an iron powder containing small amounts of sulphur, which includes the steps of soaking the said mass with the solution of a copper salt, and washing and drying the treated mass.

4. The method of treating the negative electrode of an alkaline nickel-cadmium storage battery comprising as the electrochemically active mass a chemically precipitated cadimum intermingled with at least one member of the group consisting of iron, iron oxide, copper and graphite, which includes the steps of soaking the said electrode with the solution of a nickel sulphate.

5. The method of regenerating the exhausted electrodes of alkaline storage batteries which comprises the steps of soaking the positive electrode thereof comprising a coherent mass of finely divided nickel hydroxide with the solution of a cobalt compound, soaking the negative electrode thereof comprising a coherent mass of finely divided cadmium with a nickel sulphate solution, whereby the said soaking solutions are adjusted to a concentration sufficient to add to said electrode masses a maximum of 2% of the cobalt and nickel respectively.

6. The method of activating the electrochemically active masses of an alkaline storage battery whose positive electrode means comprises finely divided nickel hydroxide as the electrochemically active mass and whose negative electrode means comprises finely divided cadmium as the electrochemically active mass, said method comprising the impregnation steps of soaking said nickel hydroxide mass with a solution of a cobalt compound, and soaking said finely divided cadmium with a solution of nickel sulphate, said soaking solutions having a concentration sufficient to add to said electrochemically active masses not more than 2% of the cobalt and nickel, respectively.

7. The method of claim 6 in which the soaked masses are treated with an alkaline solution and washed to remove soluble reaction products.

8. The method of activating the electrochemically active masses of an alkaline storage battery whose positive electrode means comprises finely divided nickel hydroxide as the electrochemically active mass and whose negative electrode means comprises a finely divided mass of electrochemically active iron metal, said method comprising the steps of impregnating said nickel hydrovide mass by soaking it with a solution of a cobalt compound, and impregnating said finely divided iron metal by soaking it with a solution of copper sulphate, said soaking solutions having a concentration sufficient to add to said electrochemically active masses not more than 2% of the cobalt and copper, respectively.

9. The method of claim 8 in which the soaked masses are treated with an alkaline solution and washed to remove soluble reaction products.

10. The method of regenerating the exhausted electrodes of alkaline storage batteries which comprises the steps of soaking the positive electrode, comprising a mass of finely divided nickel hydroxide, with a solution of a cobalt compound, soaking a negative electrode comprising a mass of finely divided iron with a solution of a copper salt, the said soaking solutions being adjusted to a concentration sufficient to add to said electrode masses not more than 2% of the cobalt and copper respectively.

11. The method of activating an alkaline storage battery having a positive electrode comprising electrochemically active finely divided nickel hydroxide and a negative electrode comprising an electrochemically active mass taken from the group consisting of finely divided iron metal and cadmium metal, comprising impregnating said nickel hydroxide mass by soaking it with a solution of a cobalt compound in an amount which adds not more than 2% of the positive electrode mass.

12. The method defined in claim 11 in which the cobalt compound is cobalt sulphate.

13. The method defined in claim 12 in which the impregnated mass is treated with alkaline solution and washed to remove water soluble substances.

14. An alkaline storage battery having a positive electrode comprising a finely divided electrochemically active mass of nickel hydroxide impregnated with a minor amount of a cobalt compound, the battery having a negative electrode comprising an electrochemically active material of the group consisting of a mass of finely divided iron metal impregnated with a minor amount of a salt of a metal nobler than iron and a mass of finely divided cadmium metal impregnated with a minor amount of a salt of a heavy metal.

15. The battery defined in claim 14 in which the cobalt compound is cobalt sulphate in an amount which adds not more than 2% of cobalt to the positive electrode mass.

16. The battery defined in claim 14 in which the cobalt compound is cobalt sulphate and the negative electrode is iron and the salt of a metal nobler than iron is copper sulphate.

17. The battery defined in claim 14 in which the cobalt compound is cobalt sulphate and the negative electrode is cadmium and the salt of a heavy metal is nickel sulphate.

18. The battery defined in claim 14 in which the minor amount is an amount which adds not more than 2% of cobalt to the positive electrode mass.

19. The battery defined in claim 14 in which the negative electrode is a metallic iron mass in admixture with mercury and copper, and the salt of a metal nobler than iron is a copper compound impregnated therein in an amount which adds copper amounting to not more than 2% of the negative electrode mass.

20. The battery defined in claim 14 in which the negative electrode is iron containing sulphur as electrochemical activating agent.

21. An alkaline storage battery having a positive electrode comprising a finely divided electrochemically active mass of nickel hydroxide impregnated with a minor amount of a cobalt compound, the battery having a negative electrode comprising an electrochemically active material of the group consisting of a mass of finely divided iron metal and a mass of finely divided cadmium metal.

22. The battery defined in claim 21 in which the cobalt compound is cobalt sulphate in an amount which adds not more than 2% of cobalt to the electrode mass.

23. The battery defined in claim 21 in which the cobalt compound is cobalt sulphate.

24. The battery defined in claim 23 in which the electrochemically active iron contains sulphur and at least one metal of the group consisting of mercury and copper.

25. An alkaline storage battery having a positive electrode comprising a finely divided electrochemically active mass of nickel hydroxide, and a negative electrode comprising an electrochemically active mass of finely divided iron metal impregnated with a minor amount of a salt of a metal nobler than iron.

26. The battery defined in claim 25 in which the said salt is copper sulphate in an amount that adds not more than 2% of copper to the negative electrode.

27. The battery defined in claim 25 in which the iron contains sulphur.

28. An alkaline storage battery having a positive electrode comprising a finely divided electrochemically active mass of nickel hydroxide, and a negative electrode comprising a finely divided mass of cadmium metal impregnated with a minor amount fo a salt of a heavy metal.

29. The battery defined in claim 28 in which the heavy metal salt is nickel sulphate in an amount providing not more than 2% of nickel in the negative cadmium electrode, and the cadmium electrode contains at least one member of the group consisting of iron metal, iron oxide, and graphite.

30. The battery defined in claim 28 in which the salt is nickel sulphate.

31. The battery defined in claim 30 in which the nickel sulphate is in an amount which adds not more than 2% nickel to the mass of the negative electrode.

32. An alkaline storage battery having a positive nickel hydroxide electrode and a negative electrode, in which the negative electrode comprises a finely divided and intimately mixed mass of cadmium and at least one member of the group consisting of iron, iron oxide, graphite and the difficulty soluble salts of nickel, copper and mercury, said mass having an activating addition of nickel sulphate in admixture, in an amount providing a nickel content of not more than 2% of the finished mass.

References Cited in the file of this patent

UNITED STATES PATENTS

| | | |
|---|---|---|
| 368,608 | Peyrusson | Aug. 23, 1887 |
| 528,648 | Reed | Nov. 6, 1894 |
| 692,507 | Edison | Feb. 4, 1902 |
| 704,304 | Edison | July 8, 1902 |
| 902,681 | Perry | Nov. 3, 1908 |
| 983,430 | Estelle | Feb. 7, 1911 |
| 1,509,138 | Grafenberg | Sept. 23, 1924 |
| 1,826,724 | Booss et al. | Oct. 13, 1931 |
| 2,213,128 | Langguth | Aug. 17, 1940 |
| 2,254,286 | Hauel | Sept. 2, 1941 |
| 2,646,454 | Herold | July 21, 1953 |

FOREIGN PATENTS

| | | |
|---|---|---|
| 480,109 | Great Britain | Aug. 15, 1936 |
| 797,547 | France | Apr. 28, 1936 |